United States Patent

Brynolf et al.

[11] Patent Number: 5,929,052
[45] Date of Patent: Jul. 27, 1999

[54] ENERGY FORMULATION

[75] Inventors: Mikael Brynolf, Kristianstad; Åke Ståhl, Sösdala; Roger Sandström, Sollefteå, all of Sweden

[73] Assignee: Sveriges Starkelseproducenter Forening U.P.A., Kristianstad, Sweden

[21] Appl. No.: 08/693,136

[22] PCT Filed: Feb. 15, 1995

[86] PCT No.: PCT/SE95/00156

§ 371 Date: Aug. 13, 1996

§ 102(e) Date: Aug. 13, 1996

[87] PCT Pub. No.: WO95/22562

PCT Pub. Date: Aug. 24, 1995

[30] Foreign Application Priority Data

Feb. 16, 1994 [SE] Sweden ................................ 9400524

[51] Int. Cl.⁶ ............................ A61K 31/70; C08B 37/16
[52] U.S. Cl. ............................ 514/58; 536/103; 536/127
[58] Field of Search ................... 514/58; 536/103, 536/127

[56] References Cited

U.S. PATENT DOCUMENTS

| | | | |
|---|---|---|---|
| 4,312,856 | 1/1982 | Korduner et al. | 424/145 |
| 4,840,807 | 6/1989 | Yoshida et al. | 426/58 |
| 5,280,017 | 1/1994 | Davies | 579/58 |

FOREIGN PATENT DOCUMENTS

| | | |
|---|---|---|
| 2132914 | 7/1984 | United Kingdom . |
| 2154469 | 9/1985 | United Kingdom . |

OTHER PUBLICATIONS

"High–Molecular–Weight Dextrin from Waxy Starch for Liquid Foods"; STN International, File CA, Chemical Abstracts; vol. 97, No. 9; Aug. 1982 (Columbus, Ohio); Nikken Chemicals Co., Ltd. (Abstract No. 71158 and JP 57074057 A2 820510 Showa, JP 80–150218 801028).

*Primary Examiner*—Elli Peselev
*Attorney, Agent, or Firm*—Baker & Botts, L.L.P.

[57] ABSTRACT

A novel dextrin-type starch is suitable for supplying energy to human beings in preparation for or after a physical activity. The starch is characterized in that it has a molecular weight of from about 15,000 to about 10,000,000, and in that its molecules are heavily branched. The invention also relates to a composition and to a method for supplying energy preparatory to a physical activity, using a starch.

10 Claims, No Drawings

ENERGY FORMULATION

The present invention relates to a novel sort of starch which is suitable for compositions which are intended to supply energy to human beings and other mammals. The invention relates in particular to a kind of starch and a composition produced therefrom for supplying energy to human beings in preparation for or after physical activity. The invention also relates to a method of producing the starch and also to a method of supplying energy to human beings as a preparatory measure before a physical activity, for instance a sporting activity, and after performing strenuous work, so as to minimize the risk of overtraining.

When performing hard muscular work, the body takes energy from glycogen stored in the muscles and liver. If these stored depots are emptied, energy is taken from the breaking down of proteins. This can result in symptoms of overtraining and in a lowering of the immunological defense against infections.

After the glycogen depots have been emptied completely, glycogen levels which exceed the initial levels quantitatively can be recreated by taking up carbohydrates. In traditional body charging processes, it is normal to eat food which is poor in carbohydrates prior to emptying the depots, whereafter the person concerned charges his/her body with food rich in carbohydrates. It is estimated that about 200 g of active carbohydrates are required for this charging process, corresponding to about 1 kg of cooked pasta. It is difficult to ingest this amount on a daily basis. By reducing the water retention capacity, it is possible to increase the active substance content and in this way ingest the food in the form of a drink instead of in a solid state, therewith facilitating ingestion.

When ingesting excess carbohydrates, glycogen is synthesized until the depots are filled. The synthesis of glycogen can take two different routes. The first route passes from glucose 6-P via glucose 1-P to UDP-D glucose, which forms glycogen. Energy (2 ATP) is consumed in the course of this synthesis. In the second route of glycogen synthesis, the glycogen is formed by reaction between UDP glucose and an initiation molecule, which may be either glycogen, dextrin or in extreme cases maltose. It is assumed that the formation of glycogen is accelerated because the starting product is a long and branched polymer, such as dextrin. Many synthesis stages are saved in such case and the storage process is expected to be more rapid.

When preparing for strenuous physical activities, such as running and skiing competitions, it is normal for the competitor to store-up the glycogen depots one or two days in advance, by eating considerable quantities of food that is rich in carbohydrates, such as rice or pasta. However, as mentioned above, such charging of the body requires the ingestion of considerable quantities of food rich in carbohydrates, in the above example about 1 kg of cooked pasta over a twenty-four hour period. It is not always easy, or comfortable, for a person to ingest such large quantities. The ingestion of so much food often results in an uncomfortable overfed feeling.

These problems could be avoided if it were possible to ingest a corresponding amount of carbohydrates in the form of a drink. This would make ingestion easier and without resulting in an uncomfortable overfed feeling, since the product would quickly pass the stomach and the liquid phase is eliminated quickly through the urine. This rapid emptying process results in the product entering the small intestine more quickly, where the product is taken-up, and the stomach is emptied. This process is controlled by osmolality, which depends on molecular weight. Furthermore, it would be possible to adapt the carbohydrates used to particularly promote the synthesis of glycogen, so as to enable a larger total amount of glycogen to be stored.

The aforesaid desiderata are achieved by means of the present invention, which provides a type of starch which particularly favours the formation of glycogen. This starch is a dextrin-type starch and has a molecular weight of between about 15,000 and 10,000,000 and the molecules of the starch are heavily branched. The starch derivative will preferably have a molecular weight of up to about 720,000. The starch is particularly stable in solution and is well suited for the preparation of liquid products that can be consumed within a calendar day.

A large number of compositions which are intended to provide energy in some suitable form in conjunction with physical activities are known from the literature. See for instance WO 91/12734, WO 91/09358 and EP-A2-0,264, 117, U.S. Pat. No. 4,312,856 and U.S. Pat. No. 4,649,051, which contain references to a considerable number of further works. The prior art compositions, however, contain mostly carbohydrates of low to average molecular weights, such as monosaccharides, disaccharides and oligosaccharides, for instance, glucose, fructose and saccharose, and maltodextrin as an example of a carbohydrate of average molecular weight. These compositions are intended to be ingested immediately prior to and during the physical activity and provide an almost instantaneous energy boost. They are not suitable for building up glycogen depots in preparation for the physical activity, and neither are they intended for this purpose. This feature constitutes a considerable difference in relation to the type of starch according to the present invention. A starch of this kind is a novel product which is not previously described in the literature or forms part of the prior art in any other way.

The inventive starch has the general formula $(C_6H_{10}O_5)_n$, where n is the number of repeating glucose units and thus the degree of polymerization. This value also determines the molecular weight, so that the molecular weight range of from about 15,000 to about 10,000,000 will correspond to a value of n from about 90 to about 65,000. The molecular weight and its distribution can be determined by gel chromatography in a known way, wherein the retention times are compared with those of calibration standards of starch types having known molecular weights. When the resultant chromatogram is presented graphically, the areas beneath the resultant peaks provide a quantitative measurement of the proportions of fractions of different molecular weights.

The inventive starch shall also be heavily branched. The degree of molecular branching can be expressed as a percentage. The percentage expresses the amount ratio between $\alpha$-1,6 bonds and $\alpha$-1,4 bonds and in native potato starch is about 3.1%. This can be determined by means of nuclear magnetic resonance measurements (NMR) on deuterated starch samples. When an inventive starch is analyzed in this way, it will be found that there have occurred novel types of bonds which do not occur traditionally in native starch.

This has been shown in the form of both $\beta$-1,4 bonds and $\beta$-1,6 bonds, and also in the form of a novel $\alpha$ bond. The inventive starch shall have a branching degree of from about 2% to about 8%, and then preferably from about 3% to about 7%.

The recited values relating to molecular weight, degree of polymerization and degree of branching are not to be considered as critical limit values, although these limits appear to include the most suitable embodiments of the invention.

The inventive starch can be produced by an acid treatment of native starch, particularly potato starch, in hot conditions at 110–140° C. and over a time period of 1–15 hours. The acid used may be hydrochloric acid in a concentration of up to about 0.15%, calculated on the dry weight of the starch, or orthophosphoric acid in a concentration of up to about 0.17%, calculated on the dry weight of the starch. Water is added in an amount necessary to provide a suitably homogenous mixture. The treatment time is preferably 6–14 hours. The conversion to the desired starch can be followed by sampling at suitable time points and analyzing the samples with respect to molecular weight and degree of branching.

The starting material used may be a native starch of different origins, deriving from potatoes, maize, rice, wheat and other types of grain, and various leguminous plants and tubers. Starch which has been pretreated in different ways may also be used, such as starch which has been hydrolyzed or oxidized. The choice of starting material is not critical to the invention.

According to a further feature of the invention, there is provided a composition for supplying energy to human beings in preparation for or subsequent to physical activity, said composition being characterized in that it includes at least one type of starch according to the invention. The composition may also contain other, conventional additives, such as flavourants, thickeners, pH-regulating agents and/or antioxidants. Furthermore, the composition may also include other energy-providing components, such as monosaccharides, disaccharides or oligosaccharides, which are able to provide an immediate energy boost and also contribute in giving the composition a sweet taste. The composition may still further also include salts and electrolytes, although these do not constitute necessary components, as the composition is primarily intended for ingestion some considerable time before the physical activity is performed. Salts and electrolytes are mainly intended to replace body losses of these substances that occur through transpiration while performing the physical activity, and shall thus primarily be ingested immediately prior to or during the activity.

The composition can be provided as a ready-to-drink aqueous solution or in the form of a liquid concentrate or in the form of a dry mixture to which water shall be added in an amount which will provide a concentration suitable for ingestion. A ready-to-consume aqueous solution of the composition will suitably contain an inventive starch in an amount corresponding to 100 to 250 g/l, this amount depending on the desired consistency of the finished composition.

The inventive starch is mainly intended for ingestion as an energy supplier in preparation for physical activity, for instance sporting activities, one or a few days before the activity is actually performed. The starch is then ingested in the form of a suitable composition in accordance with the above and is intended as a supplement to a conventional carbohydrate charging process. This enables large quantities of glycogen to be stored-up in the depots without the need to eat large quantities of food rich in carbohydrates, for instance boiled pasta or rice.

An inventive composition can be prepared by stirring the starch in cold water and allowing the starch to stand and swell for about fifteen minutes. In order to obtain a drinkable consistency, about 180 grams of starch should be used for each litre of cold water. An addition of about 210 grams of starch per litre will give a soup-like consistency, while an addition of about 240 grams per litre will give a cream-like consistency. Further preparation components, such as the aforesaid components, can either be added to the produced composition or can be mixed with the starch prior to stirring the starch in water. This enables the composition to be provided in portioned quantities, which need only be stirred into a suitable quantity of water to provide a consumption-ready portion.

In addition to a normal diet, maximal charging of an elite sportsman will require a supply of about 100–450 g of the inventive starch. The appropriate amount will depend on the person's body weight and on the strenuousness of the sporting activity concerned.

The osmolality of an inventive starch has been compared with known carbohydrates experimentally. Osmolality is a measurement of the extent to which the freezing point of an aqueous solution is lowered. A high osmolality means that substances of low molecular weight bind water, so as to make the transportation of water and nutrients dissolved therein into the cells difficult. The osmolality of blood is about 300 mOsm /l, and in order to facilitate the transportation of nutrients, it is desirable that the osmolality of the ingested preparation is markedly beneath this value.

Tests have been carried out with an inventive starch having an average molecular weight of about 720,000 and a degree of branching of about 4%. The following results were obtained:

| Type of Carbohydrates | Osmolality (mOsm/kg sol.) |
| --- | --- |
| Dextrose (DE = 100) | 950 |
| Maltodextrin (DE = about 20) | 170 |
| Maltodextrin (DE = about 10) | 90 |
| Maltodextrin (DE = about 5) | 40 |
| According to the invention | 20 |

By "DE" is meant dextrose equivalents. This value is thus 100 for dextrose. Because the inventive product does not contain sugars of lower molecular weights, no DE values have been given.

Comparison tests have been carried out in which the performance of sportsmen, which when building-up carbohydrates prior to a strenuous physical activity only ingested conventional food rich in carbohydrates, were compared with the performance of sportsmen whose diets were supplemented with an inventive starch. It was found that the group supplemented with the inventive carbohydrate produced significantly better results.

We claim:

1. A dextrin-type starch for supplying energy to human beings or mammals in preparation to or after a physical activity, characterized in that it has a molecular weight of between 15,000 and 10,000,000, a degree of polymerization from about 90 to about 65,000, and a molecular branching degree of 2 to 8%.

2. A starch according to claim 1, characterized in that it has a molecular weight of up to about 720,000.

3. A method of producing a starch according to claim 1 or 2, characterized in that native or pre-treated starch is treated with acid at a temperature of 110–140° C. for 1–15 hours.

4. A method according to claim 3, characterized in that the native starch is potato starch.

5. A composition for supplying energy to human beings or mammals preparatory to or after a physical activity, characterized in that the composition includes a starch according to claim 1 or 2.

6. A composition according to claim 5, characterized in that it includes the starch in the form of an aqueous solution.

7. A method of supplying energy to human beings in preparation for or after a physical activity, characterized by supplying a starch according to claims 1, 2, or 4.

8. A method of supplying energy to human beings in preparation for or after a physical activity, characterized by supplying a starch according to claim 3.

9. A method of supplying energy to human beings in preparation for or after a physical activity, characterized by supplying a composition according to claim 5.

10. A method of supplying energy to human beings in preparation for or after a physical activity, characterized by supplying a composition according to claim 6.

* * * * *

UNITED STATES PATENT AND TRADEMARK OFFICE
CERTIFICATE OF CORRECTION

PATENT NO. : 5,929,052

DATED : July 27, 1999

INVENTOR(S) : Brynolf et al.

It is certified that error appears in the above-identified patent and that said Letters Patent is hereby corrected as shown below:

Column 2, line 36, "$(C_6H_{10}O_5)$" should read -- $(C_6H_{10}O_5)_n$, --;

Column 2, line 37, "$_n$," should be deleted.

Signed and Sealed this

Seventeenth Day of October, 2000

Attest:

Q. TODD DICKINSON

*Attesting Officer*   *Director of Patents and Trademarks*